United States Patent [19]

Yang

[11] Patent Number: 5,594,712
[45] Date of Patent: Jan. 14, 1997

[54] OPTICAL PICKUP SYSTEM WITH FIVE LONGITUDINAL SPLITTED DETECTION AREAS TO PREVENT INFORMATION REPRODUCING ERROR BY WAVELENGTH VARIATIONS

[75] Inventor: Keun Y. Yang, Kyungki-do, Rep. of Korea

[73] Assignee: LG Electronics, Inc., Seoul, Rep. of Korea

[21] Appl. No.: 418,511

[22] Filed: Apr. 7, 1995

[30] Foreign Application Priority Data

Apr. 8, 1994 [KR] Rep. of Korea ............... 7392/1994

[51] Int. Cl.⁶ .................................................. G11B 7/00
[52] U.S. Cl. ................... 369/112; 369/44.23; 369/44.37; 369/108; 369/109
[58] Field of Search ........................ 369/112, 109, 369/44.23, 44.12, 44.37, 108; 359/566, 569

[56] References Cited

U.S. PATENT DOCUMENTS

| | | | |
|---|---|---|---|
| 5,198,916 | 3/1993 | Kim | 369/44.23 |
| 5,315,574 | 5/1994 | Saimi et al. | 369/109 |
| 5,410,529 | 4/1995 | Kurata et al. | 369/109 |
| 5,440,427 | 8/1995 | Miyake et al. | 369/112 |
| 5,483,509 | 1/1996 | Yang et al. | 369/112 |

*Primary Examiner*—Georgia Y. Epps
*Assistant Examiner*—Kim-Kwok Chu
*Attorney, Agent, or Firm*—John P. White

[57] ABSTRACT

An optical pickup system capable of improving productivity by facilitating the arrangement and assembly of components thereof and preventing an error caused by wavelength variation of a laser beam includes a laser diode used as a light source, a grating for classifying a beam from the laser diode into three diffracted lights of zero, +first and −first orders, an objective lens placed the grating and an optical disc for focusing the three diffracted lights passed through the grating on the optical disc while receiving the lights reflected from the optical disc, a photodetector divided-by-five formed of five split areas partitioned in the longitudinal direction to be arranged side by side in the sequence of fourth, first, second, third and fifth split areas to receive the lights reflected from the optical disc focusing on the respective split areas for detecting a focus error and a tracking error and reading out information recorded on the optical disc, and a hologram element divided-by-two formed of a first hologram of which reference light position is a light-emitting point of the laser diode and an object light position is set before passing the photodetector divided-by-five and a second hologram of which reference light position is the light-emitting point of the laser diode and an object light position is set after passing the photodetector divided-by-five, for diffracting the reflected lights from the optical disc prior to passing the photodetector divided-by-five, thereby being applicable to optical apparatuses such as CDPs, VDPs, ODPs and MDPs.

3 Claims, 8 Drawing Sheets

PD71, PD72, PD73, PD74, PD75

OPTICAL PICKUP SYSTEM WITH FIVE LONGITUDINAL SPLITTED DETECTION AREAS TO PREVENT INFORMATION REPRODUCING ERROR BY WAVELENGTH VARIATIONS

BACKGROUND OF THE INVENTION

1. Field of the Invention

The present invention relates to an optical pickup system applied to compact disc players (CDPs), video disc players (VDPs), optical disc players (ODPs), multi-disc players (MDPs), etc., and more particularly to an optical pickup system capable of facilitating the arrangement and assembly of components to improve productivity thereof, and preventing malfunction caused by wavelength variation of lights emitted from a laser diode.

2. Description of the Prior Art

FIG. 1 illustrates a construction of one example of a conventional optical pickup system.

Referring to FIG. 1, the optical pickup system includes a laser diode 11 being a light source, a grating 12, a hologram 13, an objective lens 14, a photodetector 15, and an optical disc 16 having optical information thereon.

The grating 12 is arranged between the laser diode 11 and hologram 13 to make lights from the laser diode 11 be three diffracted lights of zero, +first and −first orders.

At this time, the diffracted light of zero order is utilized to detect a focus error of the optical pickup system and read out the optical information recorded on the optical disc 16, and the diffracted lights of +first and −first orders are to detect a tracking error of the optical pickup system.

The hologram 13 is placed between the grating 12 and objective lens 14 for transmitting the three diffracted lights having passed through the grating 12 toward the objective lens 14, or diffracting reflected lights incident from the optical disc 16 via the objective lens 14 to the photodetector 15 divided-by-six.

The objective lens 14 between the hologram 13 and optical disc 16 allows the three diffracted lights transmitting the hologram 13 to focus onto the optical disc 16, or the light reflected from the optical disc 16 to be incident to the hologram 13.

The photodetector 15 divided-by-six is partitioned into six split areas PD11 to PD16 as shown in FIG. 2, so that the lights diffracted by the hologram 13 focus onto respective split areas. Thus, the diffracted light of zero order diffracted by the hologram 13 focuses onto the central first to fourth split areas PD11 to PD14 to be used for detecting the focus error of the optical pickup system and reading out the optical information recorded on the optical disc 16. Also, the diffracted lights of +first and −first orders diffracted by the hologram 13 focus onto the fifth split area PD15 and sixth split area PD16 to be used for detecting the tracking error of the optical pickup system.

The operation of the conventional optical pickup system having the above-mentioned construction will be described as below.

The light from the laser diode 11 is classified into the three diffracted lights of zero order for the focus error detection and information reading, and of +first and −first orders for the tracking error detection via the grating 12.

The three diffracted lights classified by the grating 12 focus on the optical disc 16 by means of the objective lens 14.

The lights focusing onto the optical disc 16 are incident to the hologram 13 via the objective lens 14, in which the lights reflected from the optical disc 16 have the information recorded on the optical disc 16 and information required for detecting the focus error and tracking error.

The lights reflected from the optical disc 16 are diffracted through the hologram 13 to focus onto the photodetector 15 divided-by-six. The diffracted light of zero order focuses onto the first to fourth split areas PD11, PD12, PD13 and PD14, and the diffracted lights of +first and −first orders focus onto the fifth and sixth split areas PD15 and PD16, respectively.

Therefore, in accordance with the pattern of the light focusing on respective split areas PD11 to PD16 of the photodetector 15 divided-by-six as shown in FIG. 3, the tracking error and focus error are detected while reading out the information recorded on the optical disc 16.

More specifically, a tracking error signal TES is detected by the difference between the diffracted lights of +first and −first orders focusing on the fifth split area PD15 and sixth split area PD16 of the photodetector 15 divided-by-six, which is given by the following equation (1).

$$TES = S15 - S16 \tag{1}$$

where reference numerals S15 and S16 respectively denote electrical signals of the lights focusing on the fifth split area PD15 and sixth split area PD16 of the photodetector 15 divided-by-six.

It can be appreciated whether the diffracted light of zero order (main beam) correctly traces tracks of the optical disc or not in view of the relation that TES>0 or TES<0.

A focus error signal FES is detected by the difference between the light focusing on the first and third split areas PD11 and PD13 and the light focusing on the second and fourth split areas PD12 and PD14, which is expressed as:

$$FES = (S11 + S13) - (S12 + S14) \tag{2}$$

where reference numerals S11 to S14 respectively denote electrical signals of the lights focusing on the split areas PD11 to PD14 of the photodetector 15 divided-by-six.

As shown in FIG. 3, the light focusing on the split areas PD11 to PD14 of the photodetector 15 divided-by-six varies in accordance with changing the distance between the optical disc 16 and objective lens 14. When the objective lens 14 is normally spaced from the optical disc 16 (i.e., when the focus error signal FES equals zero), the light circularly focuses on the split areas PD11 to PD14 as shown in FIG. 3A. Meanwhile, as shown in FIGS. 3B and 3C, if the focus error appears due to a remote distance between the objective lens 14 and optical disc 16 (i.e., if the focus error signal FES is larger than zero), otherwise the focus error appears due to a close distance between the objective lens 14 and optical disc 16 (i.e., if the focus error signal FES is smaller than zero); the light focusing on the split areas PD11 to PD14 is transformed to have the elliptical shape from the circular shape.

As can be noted in the above equations, the tracking error signal TES becomes zero and the focus error signal FES equals zero when neither the tracking error nor the focus error occur. Consequently, the tracking error and focus error are corrected in conformity with the signals, thereby accurately reading out the information recorded on the optical disc.

The information recorded on the optical disc 16 can be read out by means of the main beam, i.e., the diffracted light of zero order, focusing on the first to fourth split areas PD11 to PD14 of the photodetector 15 divided-by-six. Wherefore, the variation of the amount of light focusing on the first to fourth split areas PD11 to PD14 of the photodetector 15 divided-by-six is checked for reading out the information. Here, the optical information signal is defined by:

$$\text{Optical Information Signal} = S11 + S12 + S13 + S14 \tag{3}$$

In the conventional optical pickup system as described above, however, the wavelength of the laser beams is changed owing to an ambient such as surrounding temperature while the laser diode employed as the light source is operated, which in turn alters the diffraction angle of the diffraction elements such as the grating and hologram. For this reason, a fault of wrongly inferring the presence of the focus error and tracking error is induced although neither focus error nor tracking error occurs.

In other words, when the wavelength of the laser beam from the laser diode is 780 nm, the diffracted light normally focuses on a point "a" of the first to fourth split areas PD11 to PD14 as shown in FIG. 2. On the other hand, the diffracted light focuses on a point "b" of the first split area PD11 in case of the wavelength of 770 nm, while focusing on a point "c" of the third split area PD13 in case of the wavelength of 790 nm. As described above, the position to focus on the photodetector divided-by-six is relocated by the wavelength variation of the laser beam from the laser diode.

Therefore, since the conventional optical pickup system shown in FIG. 1 which uses astigmatism cannot compensate for the wavelength variation of the laser beam from the laser diode, the optical pickup system possibly results in malfunction regardless of nonexistence of the focus error or tracking error.

Furthermore, the wavelength varies for each laser diode fabricated, so that precise assembling of the hologram and photodetector divided-by-six involves a demanding operation originated from the predetermined wavelength of the laser beam from the laser diode to degrade productivity.

FIG. 4 illustrates a construction of another example of the conventional optical pickup system proposed for solving the malfunction resulting from the wavelength variation of the laser beam of the optical pickup system shown in FIG. 1.

Referring to FIG. 4, the optical pickup system includes a laser diode 41 used as a light source, a grating 42, a hologram element 43 divided-by-two, a collimator 44, an objective lens 45, a photodetector 46 divided-by-five, and an optical disc 47.

The grating 42 is arranged between the laser diode 41 and collimator 44 to make light from the laser diode 41 be three diffracted lights of zero, +first and −first orders, and the three diffracted lights incident to the collimator 44 via the hologram element 43 divided-by-two.

The collimator 44 disposed between the hologram element 43 divided-by-two and objective lens 45 allows the three diffracted lights passed through the grating 42 to be three parallel lights. The diffracted light of zero order is utilized to detect a focus error of the optical disc 47 and read out optical information recorded on the optical disc 47, and the diffracted lights of +first and −first orders are to detect a tracking error of the optical disc 47.

The objective lens 45 arranged between the collimator 44 and optical disc 47 focuses the three parallel lights passed through the collimator 44 onto the optical disc 47, or allows the lights reflected from the optical disc 47 to be parallel lights again.

The hologram element 43 consisting of two holograms H41 and H42 is placed between the grating 42 and collimator 44 for transmitting the three diffracted lights having passed through the grating 42 toward the collimator 44 or for diffracting three parallel lights reflected from the optical disc 47 prior to passing through the collimator 44 at different angles to form six diffracted lights which then focus onto to the photodetector 46 divided-by-five.

The photodetector 46 divided-by-five is partitioned into five split areas PD41 to PD45 as shown in FIG. 5, so that the diffracted light of zero order diffracted by the first hologram H41 of the hologram element 43 focuses onto the fourth split area PD44 to be used for reading out the optical information. Also, the diffracted light of zero order diffracted by the second hologram H42 of the hologram element 43 focuses on the boundary plane of the second and third split areas PD42 and PD43 to be used for detecting the focus error. The diffracted lights of +first and −first orders diffracted by the first and second holograms H41 and H42 of the hologram element 43 focus onto the first and fifth split areas PD41 and PD45 to be used for detecting the tracking error by the difference between the lights focusing on the split areas PD41 and PD45.

The operation of the another example of the conventional optical pickup system having the above-mentioned construction will be described as below.

The light from the laser diode 41 is classified into the three diffracted lights of zero order for the focus error detection and information reading, and of +first and −first orders for the tracking error detection via the grating 42.

The three diffracted lights through the grating 42 are incident to the collimator 44 via the hologram element 43 to be three parallel lights which then focus onto the optical disc 47 by means of the objective lens 45.

Meantime, the lights incident to the optical disc 47 are reflected to be parallel lights again via the objective lens 45 and collimator 44, and incident to the hologram element 43 divided-by-two.

At this time, the lights reflected from the optical disc 47 have the information recorded on the optical disc 47 and information required for detecting the focus error and tracking error.

The three parallel lights are incident to the hologram element 43 divided-by-two to be separated to have different angles one another by means of the first and second holograms H41 and H42. Accordingly, the photodetector 46 divided-by-five receives six parallel lights. Among the separated six parallel lights, the diffracted light of zero order separated by the hologram H41 focuses onto the fourth split area PD44 of the photodetector 46 divided-by-five, and the diffracted light of zero order separated by the second hologram H42 focuses on the boundary plane of the second and third split areas PD42 and PD43. The diffracted lights of +first order separated by the first and second holograms H41 and H42 respectively focus on the upper and lower sides of the first split area PD41. The diffracted lights of −first order separated by the first and second holograms H41 and H42 focus onto the fifth split area PD45.

Therefore, in accordance with the pattern of the lights focusing on respective split areas PD41 to PD45 of the photodetector 46 divided-by-five as shown in FIG. 5, the tracking error and focus error are detected while reading out the information recorded on the optical disc 47.

More specifically, a tracking error signal TES is detected by the difference between the diffracted lights focusing on the first split area PD41 and fifth split area PD45 of the photodetector 46 divided-by-five, which is expressed as:

$$TES = S41 - S45 \tag{4}$$

where reference numerals S41 and S45 respectively denote electrical signals of the lights focusing on the first split area PD41 and fifth split area PD45 of the photodetector 46 divided-by-five.

It can be appreciated whether the diffracted light of zero order (main beam) correctly traces tracks of the optical disc or not in view of the relation that TES>0 or TES<0.

A focus error signal FES is detected by the difference between the lights focusing on the second and third split areas PD42 and PD43, which is given by the following equation (5).

$$FES=S42-S43 \qquad (5)$$

where reference numerals S42 and S43 respectively denote electrical signals of the lights focusing on the second and third split areas PD42 to PD43 of the photodetector 46 divided-by-five.

As shown in FIG. 6, the amount of lights focusing on the second and third split areas PD42 to PD43 of the photodetector 46 divided-by-five vary in accordance with changing the distance between the optical disc 47 and objective lens 44. Here, FIG. 6A shows the focusing pattern of the light on the second and third split areas PD42 and PD43 when the objective lens 44 is distant from the optical disc 47 to cause the focus error (i.e., when FES>0). Meanwhile, FIG. 6B shows the focusing pattern of the light on the second and third split areas PD42 and PD43 when the objective lens 44 is normally spaced from the optical disc 47 to have no focus error (i.e., when FES=0). FIG. 6C shows the focusing pattern of the light on the second and third split areas PD42 and PD43 when the objective lens 44 nears to the optical disc 47 to cause the focus error (i.e., when FES<0).

As can be noted in the above equations, the tracking error signal TES becomes zero and the focus error signal FES equals zero when neither the tracking error nor the focus error occur. Consequently, the tracking error and focus error are corrected in conformity with the signals, thereby accurately reading out the information recorded on the optical disc.

The information recorded on the optical disc 47 can be read out by means of variation of the amount of the diffracted light of zero order (main beam) focusing on the second to fourth split areas PD42 to PD44 of the photodetector 46 divided-by-five. Here, the optical information signal is defined by:

$$\text{Optical Information Signal}=S42+S43+S44 \qquad (6)$$

where reference numerals S42, S43 and S44 respectively denote electrical signals of the lights focusing on the second to fourth split areas PD42, PD43 and PD44 of the photodetector 46 divided-by-five.

In the another example of the conventional optical pickup system illustrated in FIG. 4, however, the wavelength of the laser beam from the laser diode is changed owing to an ambient such as surrounding temperature while the laser diode employed as the light source is operated, which in turn alters the diffraction angle of the diffraction elements such as the grating and hologram element.

Under the state that the boundary plane of the second and third split areas PD42 and PD43 of the photodetector 46 divided-by-five is provided to form a right angle as indicated by L1 of FIG. 5, when the laser beam of a predetermined wavelength is emitted from the laser diode 41 as denoted by a reference symbol "a" of FIG. 5, the light focuses on the boundary plane of the second and third split areas PD42 and PD43 of the photodetector 46 divided-by-five to normally operate the optical pickup system.

However, as denoted by reference symbols "b" and "c" of FIG. 5, if the wavelength of the laser beam varies, the light does not focus on the boundary plane of the second and third split areas PD42 and PD43 of the photodetector 46 divided-by-five, but deviates from the boundary plane to place on the second or third split area PD42 or PD43. For this reason, the optical pickup system results in malfunction regardless of nonexistence of the focus error or tracking error.

In order to solve the error created by the wavelength variation of the laser beam from the laser diode, another example of the conventional optical pickup system shown in FIG. 4 has the photodetector divided-by-five provided in such a manner that the second and third split areas PD42 and PD43 of the photodetector 46 contact to form the boundary plane tilted by a minute angle θ as indicated by L2 of FIG. 5.

In other words, when the wavelength of the laser beam from the laser diode 41 is 780 nm, the light focuses on the point "a" at the boundary plane of the second and third split areas PD42 to PD43 of the photodetector 46 divided-by-five. On the other hand, the light focuses on the point "b" at the boundary plane of the second and third split areas PD42 and PD43 in case of the wavelength of 770 nm, while focusing on the point "c" at the boundary plane of the second and third split areas PD42 and PD43 in case of the wavelength of 790 nm.

Therefore, the boundary plane of the second and third split areas of the photodetector divided-by-five is obliquely provided by a predetermined angle in consideration of the wavelength variation of the laser beam from the laser diode, so that the focusing position of the light is relocated to the boundary plane of the second and third split areas when the wavelength of the laser beam is varied.

By this structure, the focus error signal FES maintains the zero state in case of involving no focus error even though the wavelength of the laser beam from the laser diode is varied to thereby solve the problem caused by the wavelength variation.

In the another example of the conventional optical pickup system shown in FIG. 4, the second and third split areas PD42 and PD43 of the photodetector 46 divided-by-five contact to provide the boundary plane tilted by the predetermined angle for the purpose of correcting the wavelength variation of the laser beam from the laser diode as illustrated in FIG. 5. However, the angle at the boundary plane is so minutely provided that the focus error occurs because of the wavelength variation even with a slight error in the angle to result in malfunction of the optical pickup system.

Furthermore, not only the fabrication of the photodetector divided-by-five for precisely adjusting the minute angle of the boundary plane, but also the arrangement of the hologram element and photodetector divided-by-five are very fastidious to significantly lower the productivity.

SUMMARY OF THE INVENTION

It is an object of the present invention to provide an optical pickup system for focusing a light on a portion across neighboring split areas of a photodetector to detect a focus error by means of the size of the focusing light, thereby being unaffected by the wavelength variation of the light.

It is another object of the present invention to provide an optical pickup system for using a holographic optical element to easily arrange components thereof free from the wavelength of a light and attain small-sized and light-weight optical pickup system.

It is still another object of the present invention to provide an optical pickup system for facilitating the arrangement and assembly of components thereof to improve productivity.

It is yet another object of the present invention to provide an optical pickup system capable of preventing malfunction resulting from the wavelength variation of a light emitted from a light source.

To achieve the above and other objects of the present invention, there is provided an optical pickup system for reading out/recording information from/on an optical disc including a laser diode used as a light source, and a grating for classifying a beam from the laser diode into three diffracted lights of zero, +first and −first orders. An objective lens is placed between the grating and optical disc for focusing the three diffracted lights passed through the grating on the optical disc, and receiving the lights reflected from the optical disc. Also, a photodetector divided-by-five for detecting a focus error and a tracking error and reading out the information recorded on the optical disc is formed of five split areas partitioned in the longitudinal direction to be arranged side by side in the sequence of fourth, first, second, third and fifth split areas, so that the lights reflected from the optical disc focus on the respective split areas. Additionally, a hologram element divided-by-two is formed of a first hologram of which reference light position is a light-emitting point of the laser diode and an object light position is set before passing the photodetector divided-by-five, and a second hologram of which reference light position is the light-emitting point of the laser diode and an object light position is set after passing the photodetector divided-by-five, for diffracting the reflected lights from the optical disc prior to passing the photodetector divided-by-five.

Preferably, the photodetector divided-by-five and hologram element divided-by-two are constructed in such a manner that the diffracted light of zero order for detecting the focus error and reading out optical information is diffracted by the first hologram of the hologram element to focus on the first and second split areas of the photodetector divided-by-five, and the section thereof cut by the photodetector divided-by-five is placed on the second split area by contacting a boundary plane of the first and second split areas, while the diffracted light of zero order is diffracted by the second hologram to focus on the second and third split areas, and the section thereof cut by the photodetector divided-by-five is placed on the third split area by contacting a boundary plane of the second and third split areas. Moreover, the diffracted light of +first order for detecting the tracking error is diffracted by the first and second holograms to focus on the fourth split area of the photodetector divided-by-five and the sections cut by the photodetector divided-by-five are placed on the fourth area side by side, and the diffracted light of −first order for detecting the tracking error is diffracted by the first and second holograms to focus on the fifth split area, and the sections cut by the photodetector divided-by-five are placed on the fifth split area side by side.

BRIEF DESCRIPTION OF THE DRAWINGS

The above objects and other advantages of the present invention will become more apparent by describing in detail preferred embodiments thereof with reference to the attached drawings in which:

FIGS. 3A–3C show a focusing state of the light on the photodetector divided-by-six of FIG. 2 in accordance with the occurrence of a focus error in the conventional optical pickup system, wherein FIG. 3A shows a state of the light when the objective lens maintains a normal distance from the optical disc, FIG. 3B shows the focusing state of the light when the objective lens is distant from the optical disk, and FIG. 3C shows the focusing state of the light when the objective lens is near to the optical disk;

FIGS. 6A–6C show a focusing state of the light on the photodetector divided-by-five of FIG. 5 in accordance with the occurrence of a focus error in the conventional optical pickup system, wherein FIG. 6A shows the focusing state of the light when the objective lens is distant from the optical disk, FIG. 6B shows the focusing state of the light when the objective lens maintains a normal distance from the optical disc, and FIG. 6C shows the focusing state of the light when the objective lens is near to the optical disk;

FIGS. 9A–9C show a focusing state of the light on the photodetector divided-by-five of FIG. 8 in accordance with the occurrence of a focus error in the optical pickup system according to the present invention, wherein FIG. 9A shows the focusing state of the light when the objective lens maintains a normal distance from the optical disk, FIG. 9B shows the focusing state of the light when the objective lens is distant from the optical disc, and FIG. 9C shows the focusing state of the light when the objective lens is near to the optical disk; and FIGS. 10A–10B are views showing the diffraction of the laser beam by means of the hologram element of the optical pickup system of FIG. 7, wherein FIG. 10A is a front view thereof, and FIG. 10B is a side view thereof.

DETAILED DESCRIPTION OF THE PREFERRED EMBODIMENTS

Figure 1:
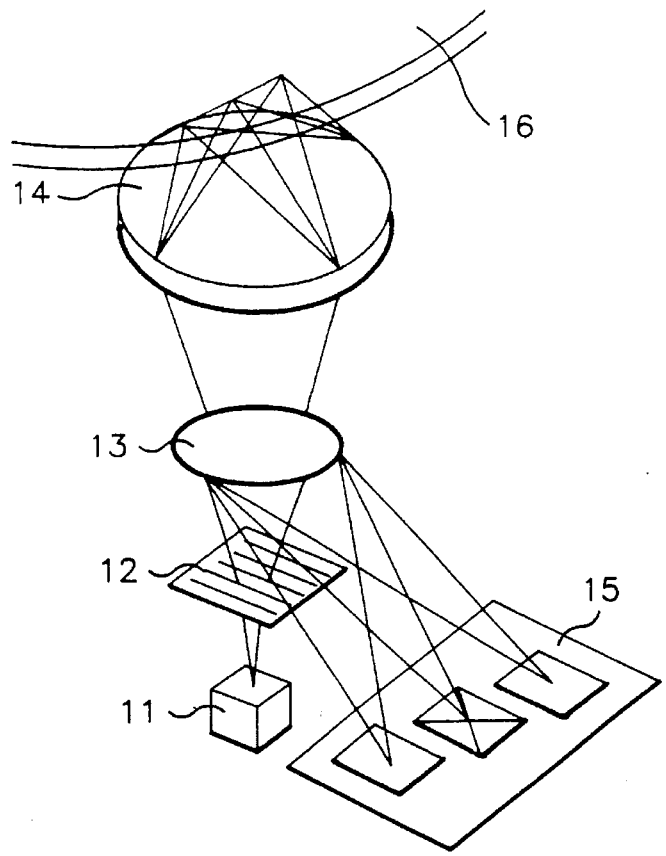
FIG. 1 is a view showing a construction of one example of a conventional optical pickup system.
Figure 2:
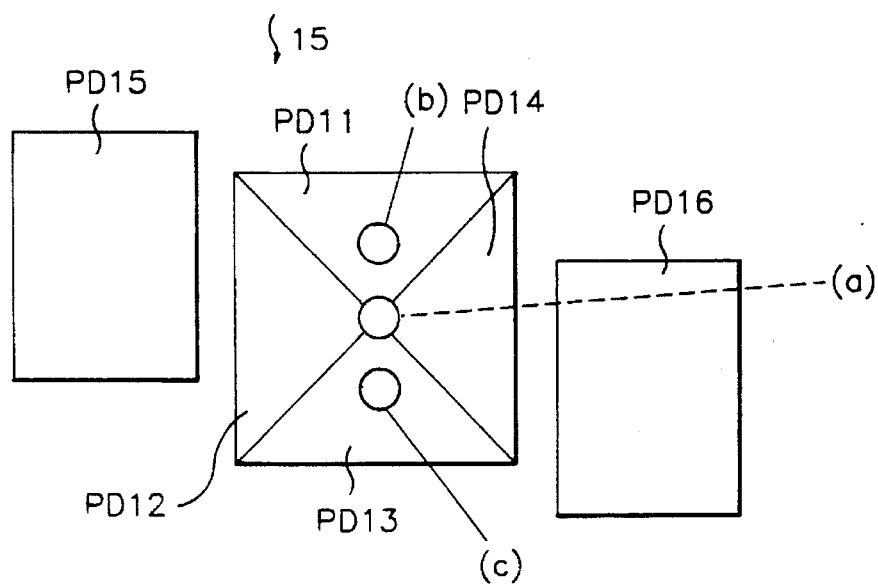
FIG. 2 shows the structure of the photodetector divided-by-six in the conventional optical pickup system of FIG. 1.
Figure 3A:
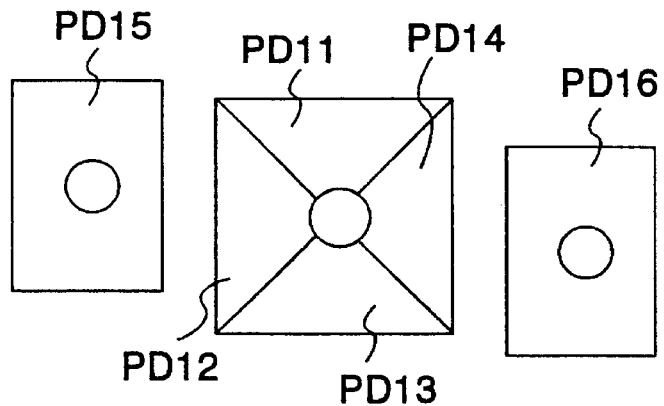
Figure 3B:
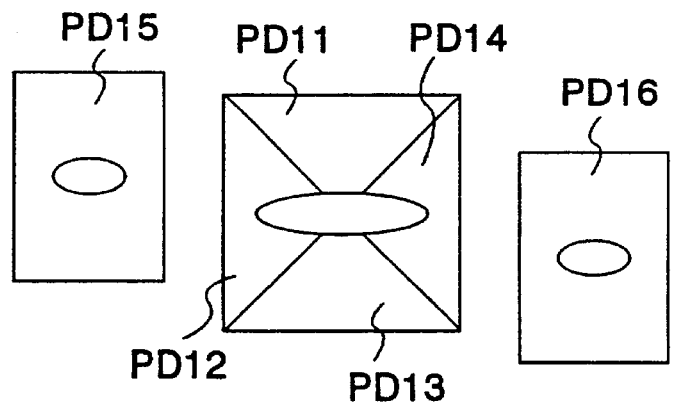
Figure 3C:
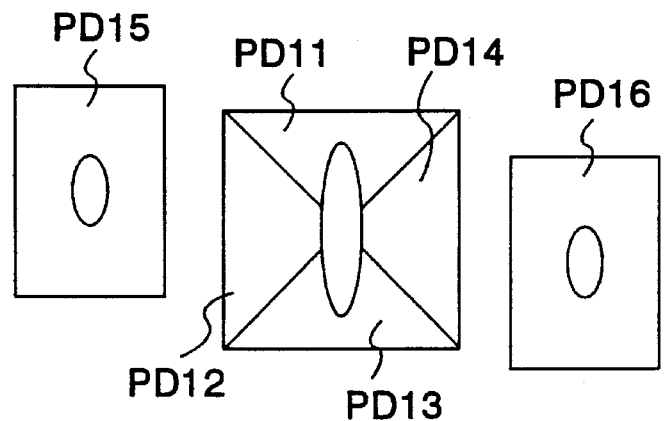
Figure 4:
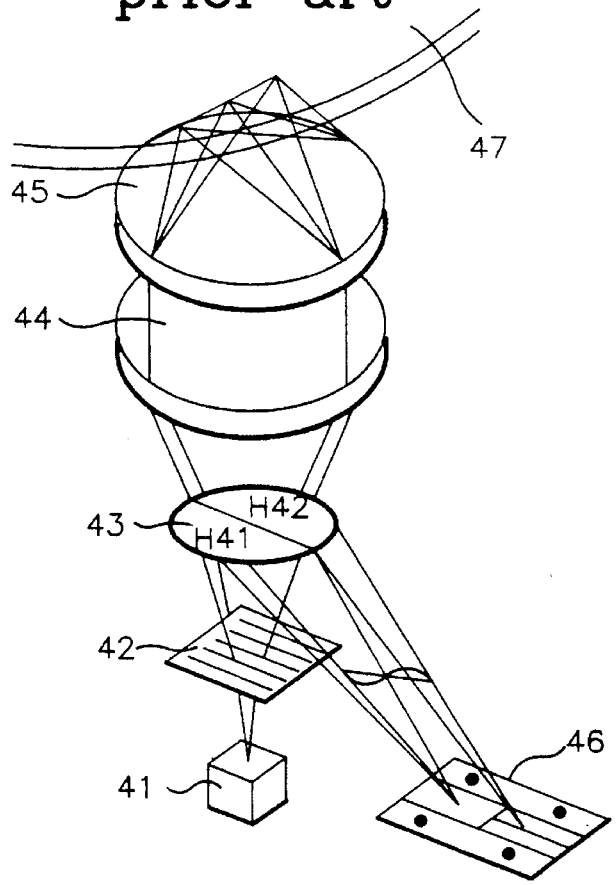
FIG. 4 is a view showing a construction of another example of the conventional optical pickup system.
Figure 5:
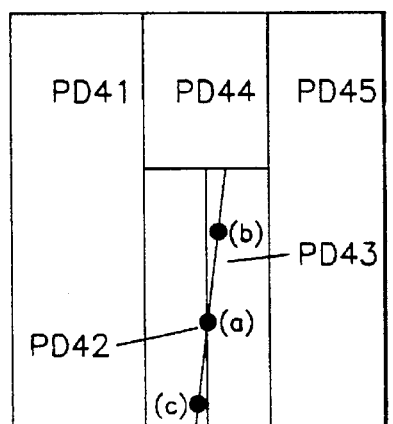
FIG. 5 shows the structure of the photodetector divided-by-five in the conventional optical pickup system of FIG. 4.
Figure 6A:
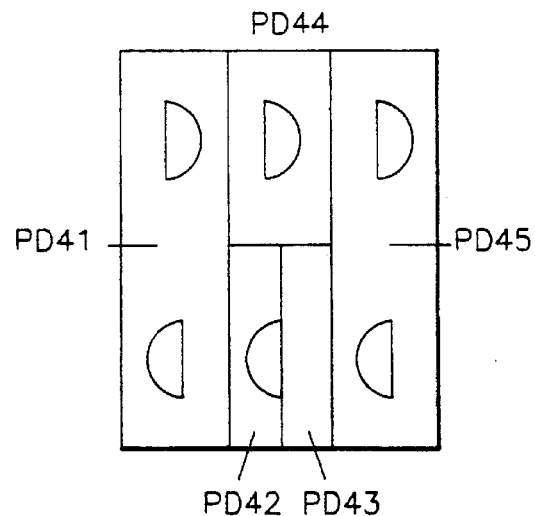
Figure 6B:
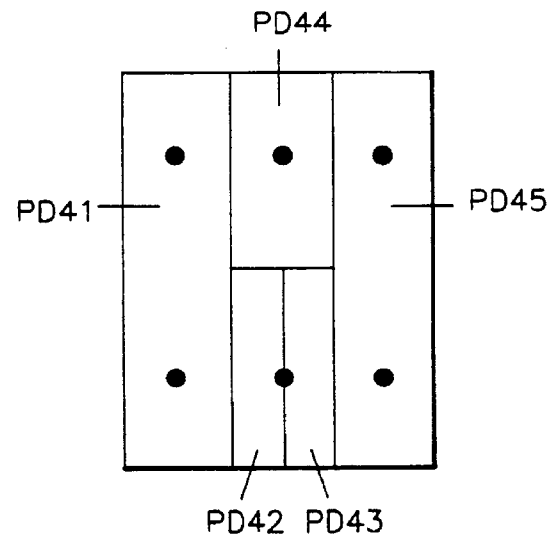
Figure 6C:
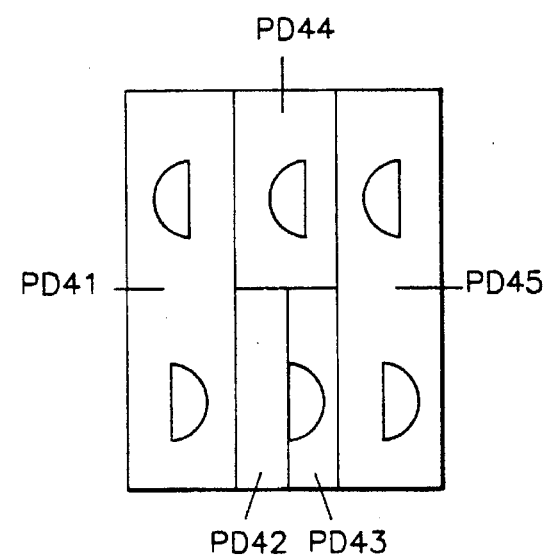
Figure 7:
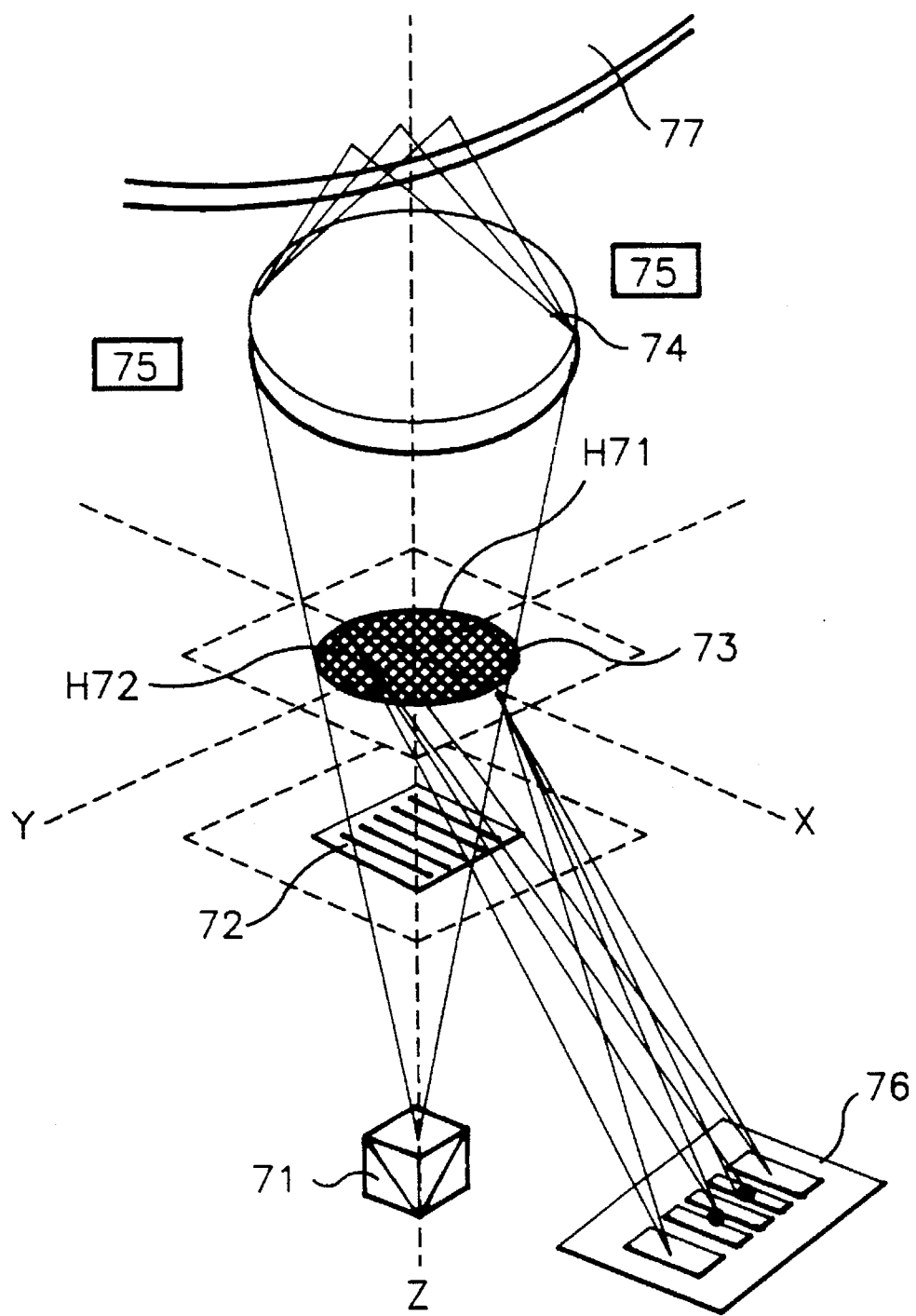
FIG. 7 is a view showing a construction of an optical pickup system according to the present invention.

Referring to FIG. 7, an optical pickup system according to the present invention includes a laser diode 71 used as a light source, a grating 72, a hologram element 73 divided-by-two, an objective lens 74, an actuator 75, a photodetector 76 divided-by-five, and an optical disc 77.

The grating 72 is arranged between the laser diode 71 and hologram element 73 divided-by-two to make lights from the laser diode 71 be three diffracted lights of zero, +first and −first orders, and the three diffracted lights incident to the hologram element 73 divided-by-two.

The diffracted light of zero order is utilized to detect a focus error of the optical disc 77 and read out optical information recorded on the optical disc 77, and the diffracted lights of +first and −first orders are to detect a tracking error of the optical disc 77.

The objective lens 74 arranged between the hologram element 73 divided-by-two and optical disc 77 focuses the three diffracted lights passed through the grating 72 on the optical disc 77, or allows the lights reflected from the optical disc 77 to be repeatedly incident to the hologram element 73 divided-by-two.

The hologram element 73 consisting of two holograms H71 and H72 is placed between the grating 72 and objective lens 74 for transmitting the three diffracted lights having passed through the grating 72 toward the objective lens 74 or for diffracting the lights reflected from the optical disc 77 prior to passing the objective lens 74 to the photodetector 76 divided-by-five.

Figure 10A:
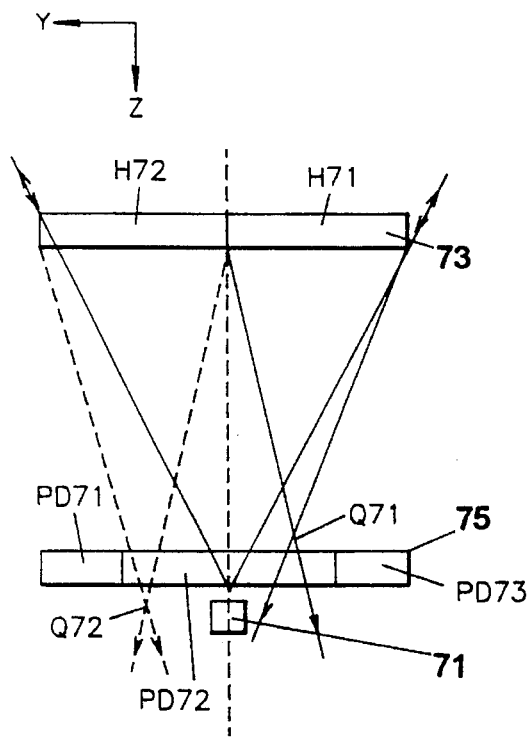
Figure 10B:
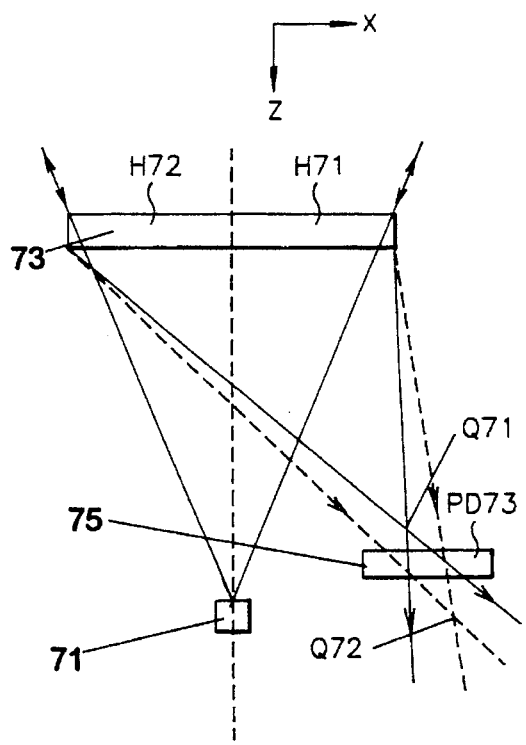

As shown in FIG. 10, the position of a reference light of the first hologram H71 of the hologram element 73 divided-by-two is a light-emitting point of the laser diode 71, and the position of an object light thereof is a point Q71 before passing the photodetector 76 divided-by-five. Also, the position of a reference light of the second hologram H72 is the light-emitting point of the laser diode 71, and the position of an object light thereof is a point Q72 after passing the photodetector 76 divided-by-five.

Figure 8:
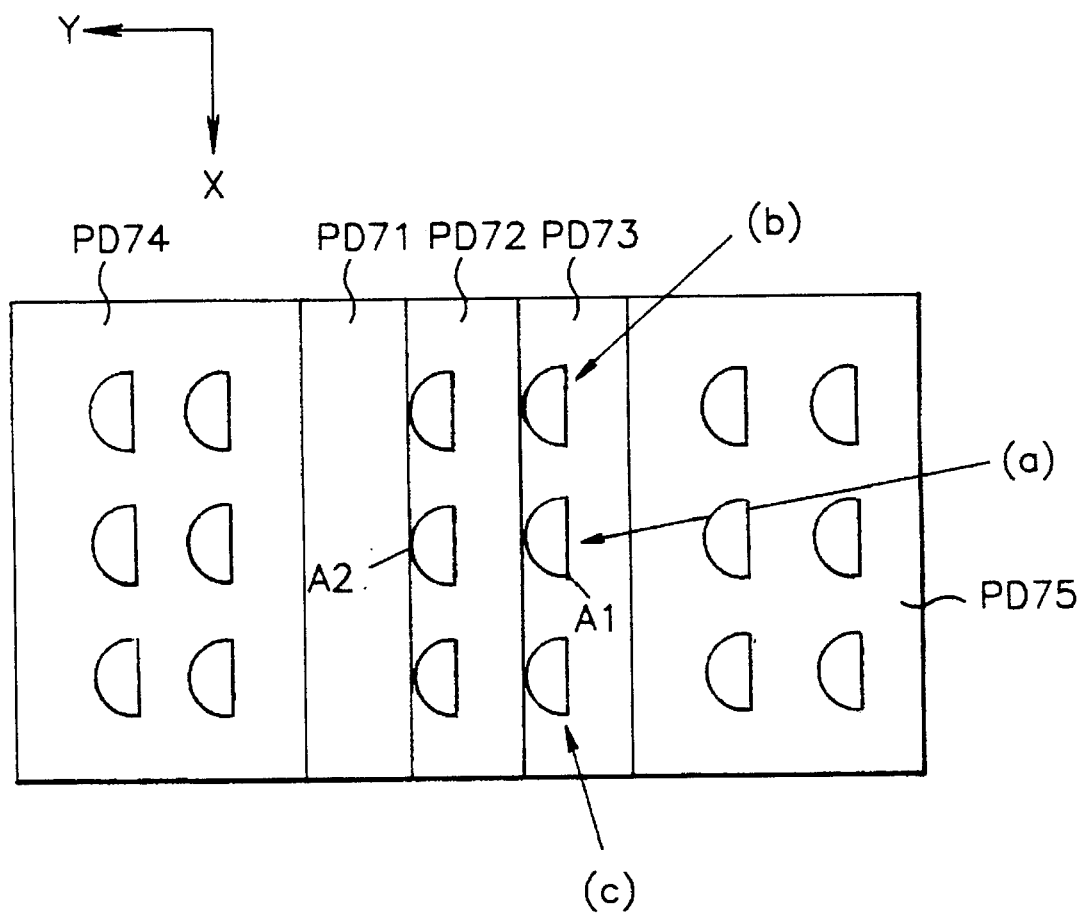
FIG. 8 shows the structure of the photodetector divided-by-five in the optical pickup system of FIG. 7.

The photodetector 76 divided-by-five is partitioned into five split areas PD71 to PD75 as shown in FIG. 8, so that the diffracted light of zero order diffracted by the hologram element 73 focuses onto the central first to third split areas PD71, PD72 and PD73 among the five split areas PD71 to PD75. The diffracted lights of +first and −first orders are diffracted by the hologram element 73 to focus onto the peripheral fourth and fifth split areas PD74 and PD75.

The hologram element 73 divided-by-two and photodetector 76 divided-by-five of the optical pickup system according to the present invention are constructed in such a manner that, once the light focusing toward the light-emitting point of the laser diode 71 is incident to the hologram element 73 divided-by-two, the light incident to the second hologram H72 is diffracted to focus on the point Q72 by passing through the second split area PD72 of the photodetector 76 divided-by-five, and the light incident to the first hologram H71 is diffracted to focus on the point Q71 prior to passing through the third split area PD73 of the photodetector 76 divided-by-five. At the same time, the light onto the photodetector 76 divided-by-five focusing by means of the second hologram H72 places on the third split area PD73 by permitting the section thereof cut by the photodetector 76 divided-by-five to contact the boundary plane of the second and third split areas PD72 and PD73 (as designated by A1 of FIG. 8), and the light onto the photodetector 76 divided-by-five focusing by means of the first hologram H71 places on the second split area PD72 by contacting the boundary plane of the first and second split areas PD71 and PD72 (as designated by A2 of FIG. 8)

The actuator 75 drives the objective lens 74 up and down for constantly maintaining the distance between the objective lens 74 and optical disc 77 when the focus error is detected due to the close or remote distance between them.

The operation of the optical pickup system having the above-mentioned construction will be described as below.

The light from the laser diode 71 is classified into the three diffracted lights of zero order for the focus error detection and information reading, and of +first and −first orders for the tracking error detection via the grating 72.

The three diffracted lights through the grating 72 focus onto the optical disc 77 by means of the objective lens 74 via the hologram element 73. Here, the diffracted light of zero order focuses onto the optical disc 77 to be used for detecting the focus error and reading out information on the optical disc 77. The diffracted lights of +first and −first orders focus onto the optical disc 77 to be used for detecting the tracking error.

Meantime, the lights reflected by the optical disc 77 are incident to the hologram element 73 divided-by-two via the objective lens 74.

Here, the lights reflected from the optical disc 77 have the information recorded on the optical disc 77 and information required for detecting the focus error and tracking error.

The lights reflected from the optical disc 77 are diffracted by the hologram element 73 divided-by-two to focus on the photodetector 76 divided-by-five. The diffracted light of zero order focuses onto the first to third split areas PD71, PD72 and PD73 of the photodetector 76 divided-by-five, and the diffracted lights of +first and −first orders focus onto the fourth and fifth split areas PD74 and PD75 of the photodetector 76 divided-by-five.

At this time, the diffracted light of zero order incident to the hologram element 73 divided-by-two is diffracted by the second hologram H72 to focus on the point Q72 after passing through the photodetector 76 divided-by-five, and diffracted by the first hologram H71 to focus on the point Q71 prior to passing through the photodetector 76 divided-by-five.

The sectional view of the diffracted light of zero order cut by the photodetector 76 divided-by-five is as shown in FIG. 8. Thus, the diffracted light of zero order diffracted by the second hologram H72 places on the third split area PD73 by permitting the section thereof to contact the boundary plane of the second and third split areas PD72 and PD73 as a reference symbol B1 of FIG. 8. Whereas, the diffracted light of zero order diffracted by the first hologram H71 places the second split area PD72 by permitting the section thereof to contact the boundary plane of the first and second split areas PD71 and PD72 as a reference symbol B2 of FIG. 8.

Hereinafter, a method for detecting a focus error signal and a tracking error signal, and reading out optical information by means of the lights focusing on respective split areas PD71 to PD75 of the photodetector 76 divided-by-five will be described.

Figure 9A:
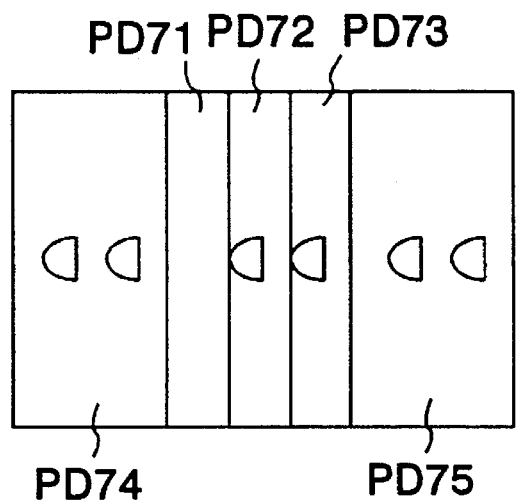

When the optical disc 77 and objective lens 74 exactly maintain the distance, i.e., without involving the focus error, the light focusing on the second split area PD72 is identical to the light focusing on the first & third split area PD71+PD73 of the photodetector 76 divided-by-five, as shown in FIG. 9A.

Figure 9B:
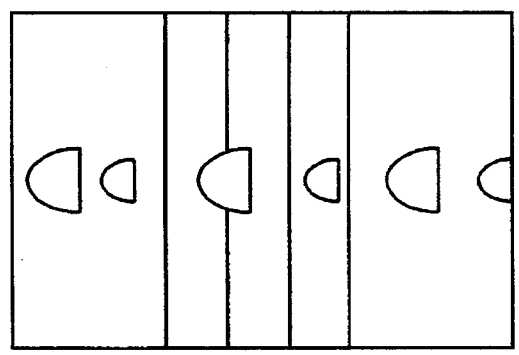

If the objective lens 74 is near to the optical disc 77, the lights are respectively diffracted by the holograms H71 and H72, so that the focusing points Q71 and Q72 of the lights focusing on respective split areas of the photodetector become distant from each other. Thus, as shown in FIG. 9B, the light on the second split area PD72 focusing by the second hologram H72 has an increased sectional dimension to extend to the first split area PD71, while the light on the third split area PD73 focusing by the first hologram H71 has a reduced sectional dimension to unaffect on the second split area PD72.

Figure 9C:
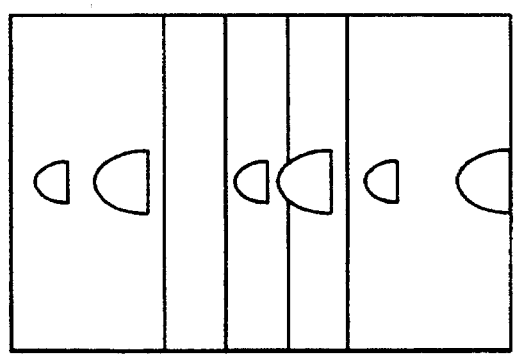

On the contrary, when the objective lens 74 is distant from the optical disc 77, the lights are conversely diffracted by the holograms H71 and H72, so that the focusing points Q71 and Q72 of the lights focusing on respective split areas of the photodetector become near to each other. Thus, as shown in FIG. 9C, the light on the second split area PD72 focusing by the second hologram H72 has a reduced sectional dimension to unaffect on the first split area PD71, while the light on the third split area PD73 focusing by the first hologram H71 has an increased sectional dimension to extend to the second split area PD72.

At this point, the focus error signal FES is detected by the difference between the lights focusing on the second split area PD72 and first & third split area PD71+PD73, which is expressed as:

$$FES = S72 - (S71 + S73) \tag{7}$$

where reference numerals S71, S72 and S73 respectively denote electrical signals of the lights focusing on the first to third split areas PD71 to PD73 of the photodetector 76 divided-by-five.

As described above, the lights focusing on the second split area PD72 and first & third split area PD71+PD73 of the photodetector 76 divided-by-five vary in accordance with changing the distance between the optical disc 77 and objective lens 74. When the objective lens 74 is normally spaced from the optical disc 77, the focus error signal FES equals zero as shown in FIG. 9A. Meanwhile, the focus error signal FES is larger than zero as shown in FIG. 9B in case of occurring the focus error owing to the far distance between the objective lens 74 and optical disc 77, or the focus error signal FES is smaller than zero as shown in FIG. 9C with the focus error owing to the close distance between them. Consequently, when the objective lens 74 is not normally spaced from the optical disc 77, the objective lens 74 is moved up and down by using the actuator 75 to correct the focus error.

On the other hand, the diffracted light of +first order for detecting the tracking error is diffracted by the first and second holograms H71 and H72, and the diffracted lights respectively focus on the fourth split area PD74 of the photodetector 76 divided-by-five. Then, the sections of them cut by the photodetector 76 divided-by-five place side by side within the fourth split area PD74. The diffracted light of −first order for detecting the tracking error is diffracted by the first and second holograms H71 and H72, and the diffracted lights respectively focus on the fifth split area PD75. Then, the sections of them cut by the photodetector 76 divided-by-five place side by side within the fifth split area PD75.

Accordingly, the tracking error signal TES is detected by the difference between the lights focusing on the fourth split area PD74 and fifth split area PD75 of the photodetector 76 divided-by-five, which is expressed as:

$$TES = S74 - S75 \tag{8}$$

where reference numerals S74 and S75 respectively denote electrical signals of the lights focusing on the fourth split area PD74 and fifth split area PD75 of the photodetector 76 divided-by-five.

It can be appreciated whether the diffracted light of zero order (main beam) correctly traces tracks of the optical disc or not in view of the relation that TES>0 or TES<0.

As can be noted in the above equations, the tracking error signal TES becomes zero and the focus error signal FES equals zero when neither the tracking error nor the focus error occur. In conformity with the signals, the tracking error and focus error are corrected to enable accurate reading of the information recorded on the optical disc.

The information recorded on the optical disc 77 can be read out by means of variation of the amount of diffracted light focusing on the second to fourth split areas PD72 to PD74 of the photodetector 76 divided-by-five. Here, the optical information signal is defined by:

$$\text{Optical Information Signal} = S71 + S72 + S73 \tag{9}$$

where reference numerals S71, S72 and S73 respectively denote electrical signals of the lights focusing on the first to third split areas PD71, PD72 and PD73 of the photodetector 76 divided-by-five.

The optical pickup system according to the present invention using the above-stated tracking error and focus error detecting method is unaffected by the wavelength variation of the laser beam during the operation of the laser diode.

The laser beam focusing by the hologram element 73 is relocated along the X-axis in the longitudinal direction to be disposed at a point "a" of FIG. 8 with the wavelength of 780 nm, at a point "b" of FIG. 8 with the wavelength of 770 nm, and at a point "c" of FIG. 8 with the wavelength of 790 nm, so that the focusing light focuses on the corresponding area without being deviated therefrom. Briefly, since respective split areas of the photodetector divided-by-five are partitioned in the longitudinal direction, the focusing light focuses on the corresponding area free from the wavelength variation and, further, the sections of the lights cut by the photodetector is identical to each other, the focus error caused by the wavelength variation does not occur in the optical pickup system according to the present invention.

As a result, the wavelength variation of the laser beam from the laser diode cannot bring about an error unless the focus error occurs by the distance change between the objective lens and optical disc.

In the above-described structure, the optical pickup system is formed of the hologram element divided-by-two and photodetector divided-by-five to accomplish small size and light weight.

Moreover, respective split areas of the photodetector divided-by-five are partitioned in the longitudinal direction to be aligned side by side, and the light is relocated along the longitudinal direction within a corresponding split area to focus thereon even if the wavelength of the laser beam from the laser diode is varied, thereby preventing the occurrence of the focus error caused by the wavelength variation of the laser beam. For these reasons, the focus error can be accurately detected over the conventional method while preventing the malfunction of the optical pickup system.

In addition, each component has heretofore precisely arranged or assembled by considering the wavelength variation of the laser beam, but the components can be assembled or arranged without considering the wavelength variation in the optical pickup system according to the present invention. Therefore, the arrangement and assembly of the components is much facilitated, which in turn furthers the productivity.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup system for reading out/recording information from/on an optical disc comprising:

a laser diode used as a light source;

a grating for classifying a beam from said laser diode into three diffracted lights of zero, +first and −first orders;

an objective lens placed between said grating and optical disc for focusing said three diffracted lights passed through said grating on said optical disc, and receiving the lights reflected from said disc;

a photodetector divided-by-five for detecting a focus error and a tracking errors and reading out said information recorded on said optical disc, said photodetector formed of five split areas partitioned in the longitudinal direction to be arranged side by side in the sequence of fourth, first, second, third, and fifth split areas to receive said lights reflected from said optical disc; and a hologram element divide-by-two formed of a first hologram of which reference light position is a light-emitting point of said laser diode and an object light is focussed before passing said photodetector divided-by-five, and a second hologram of which reference light position is said light-emitting point of said laser diode and an object light is focussed after passing said photodetector divided-by-five, for diffracting the reflected lights from said optical disc prior to passing said photodetector divided-by-five.

2. An optical pickup system as claimed in claim 1, wherein said diffracted light of zero order for detecting said focus error and reading out optical information is diffracted by said first hologram of said hologram element to focus on said first and second split areas of said photodetector divided-by-five, and the section thereof cut by said photodetector divided-by-five is placed on said second split area by contacting a boundary plane of said first and second split areas; while said diffracted light of zero order is diffracted by said second hologram to focus on said second and third split areas, and the section thereof cut by said photodetector divided-by-five is placed on said third split area by contacting a boundary plane of said second and third split areas.

3. An optical pickup system as claimed in claim 1, wherein said diffracted light of +first order for detecting said tracking error is diffracted by said first and second holograms to focus on said fourth split area of said photodetector divided-by-five and the sections cut by said photodetector divided-by-five are placed on said fourth area side by side; and said diffracted light of −first order for detecting said tracking error is diffracted by said first and second holograms to focus on said fifth split area, and the sections cut by said photodetector divided-by-five are placed on said fifth split area side by side.

\* \* \* \* \*